(12) United States Patent
Zhu et al.

(10) Patent No.: US 11,291,071 B2
(45) Date of Patent: Mar. 29, 2022

(54) SYSTEM AND METHOD FOR RADIO FREQUENCY BAND SELECTION FOR NEW RADIO STANDALONE AND NON-STANDALONE SERVICES

(71) Applicant: Verizon Patent and Licensing Inc., Basking Ridge, NJ (US)

(72) Inventors: Lily Zhu, Parsippany, NJ (US); Susan Wu Sanders, Bridgewater, NJ (US); Brian T. Mecum, Aliso Viejo, CA (US); Monte Giles, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 7 days.

(21) Appl. No.: 16/856,321

(22) Filed: Apr. 23, 2020

(65) Prior Publication Data

US 2021/0337620 A1  Oct. 28, 2021

(51) Int. Cl.
  *H04W 24/10* (2009.01)
  *H04W 76/27* (2018.01)
  *H04W 36/00* (2009.01)
  *H04W 76/16* (2018.01)
  *H04W 88/06* (2009.01)

(52) U.S. Cl.
  CPC .......... *H04W 76/27* (2018.02); *H04W 24/10* (2013.01); *H04W 36/0022* (2013.01); *H04W 76/16* (2018.02); *H04W 88/06* (2013.01)

(58) Field of Classification Search
  CPC . H04W 76/27; H04W 24/10; H04W 36/0022; H04W 76/16; H04W 88/06
  See application file for complete search history.

(56) References Cited

U.S. PATENT DOCUMENTS

| | | | | |
|---|---|---|---|---|
| 2019/0037343 | A1* | 1/2019 | Parab | H04W 4/021 |
| 2020/0337054 | A1* | 10/2020 | Kwok | H04W 76/27 |
| 2021/0058735 | A1* | 2/2021 | Wirola | H04W 4/021 |

* cited by examiner

*Primary Examiner* — Chuong A Ngo

(57) ABSTRACT

A method, a system, and a non-transitory storage medium are described in which a radio frequency band selection service is provided. The radio frequency band selection service may include a default service band, a default coverage band, and a threshold value that allows an end device to select a radio frequency band to camp on when in an idle mode, select a radio frequency band to obtain service when in a connected mode, and select stand-alone or non-stand-alone services.

20 Claims, 7 Drawing Sheets

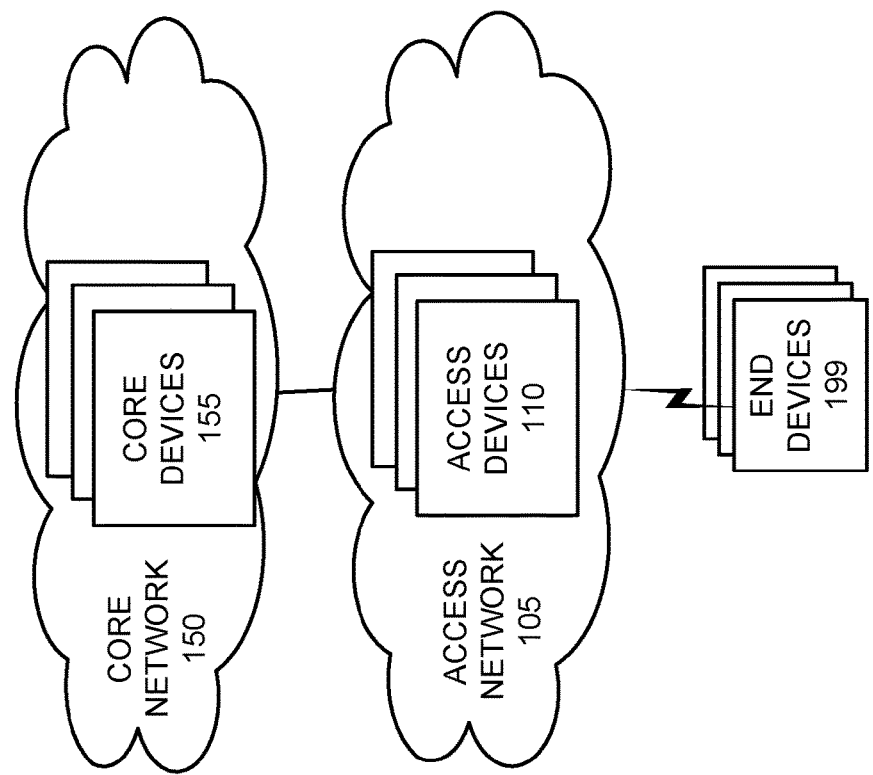
Fig. 1

600

GENERATE A SIB MESSAGE THAT INCLUDES AN S CRITERION
CELL SELECTION PARAMETER VALUE
605

TRANSMIT THE SIB MESSAGE TO AN END DEVICE
610

Fig. 6

SYSTEM AND METHOD FOR RADIO FREQUENCY BAND SELECTION FOR NEW RADIO STANDALONE AND NON-STANDALONE SERVICES

BACKGROUND

Development and design of radio access networks (RANs), core networks, and application service networks, present certain challenges from a network-side perspective and an end device perspective. For example, depending on the configurations from both network-side and end device-side perspectives, such configurations may impact various performance metrics, such as accessibility, congestion, latency, throughput, etc. Accordingly, a need exists to overcome these challenges.

BRIEF DESCRIPTION OF THE DRAWINGS

FIG. 1 is a diagram illustrating an exemplary environment in which an exemplary embodiment of a radio frequency band selection service may be implemented;

FIG. 6 is a flow diagram illustrating another exemplary process of an exemplary embodiment of the radio frequency band selection service.

DETAILED DESCRIPTION OF PREFERRED EMBODIMENTS

Figure 2:
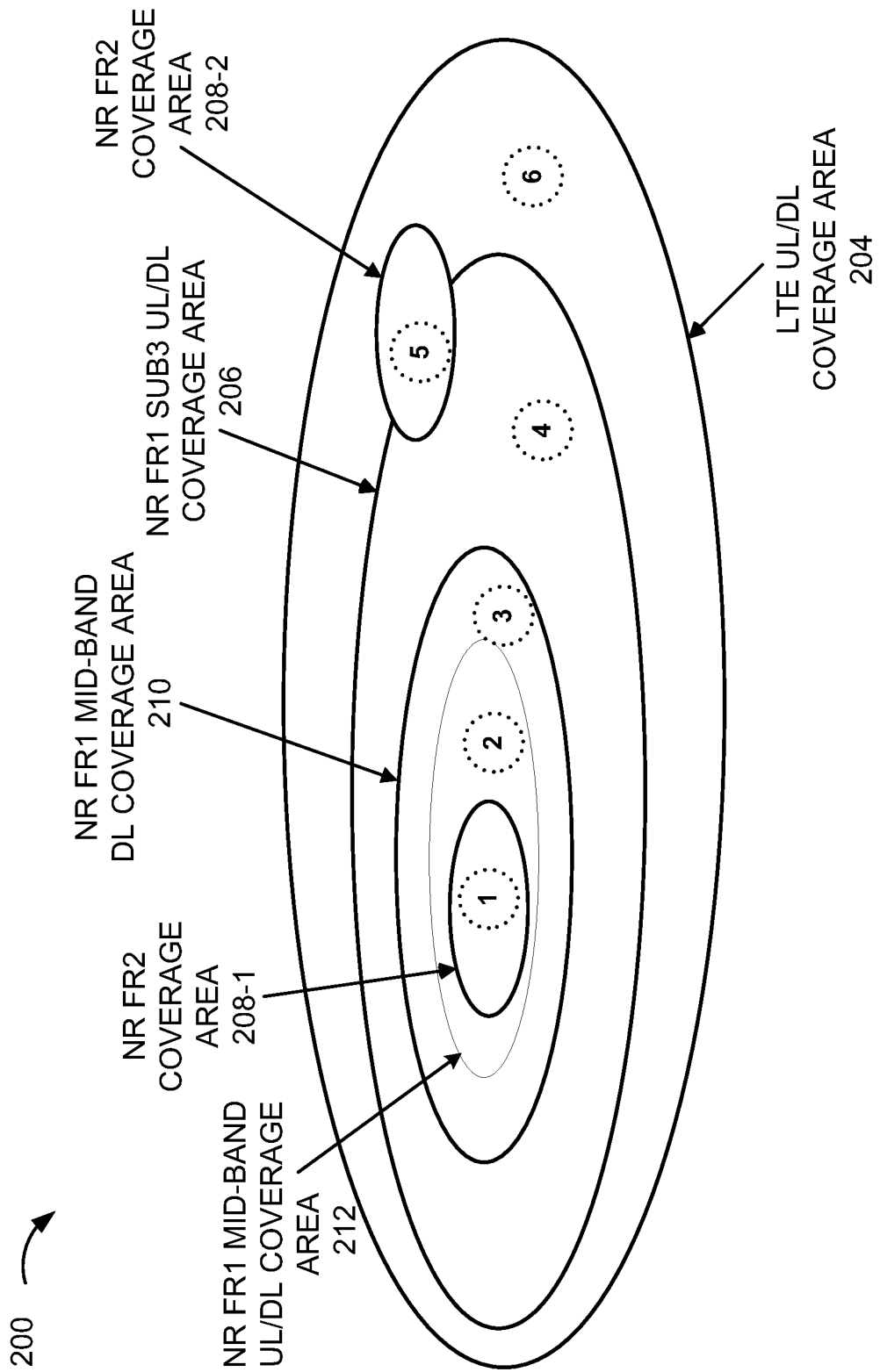
FIG. 2 is a diagram illustrating another exemplary environment in which an exemplary embodiment of the radio frequency band selection service may be implemented.

The following detailed description refers to the accompanying drawings. The same reference numbers in different drawings may identify the same or similar elements. Also, the following detailed description does not limit the invention.

A Fifth Generation (5G) new radio (NR) network may provide standalone (SA) and non-standalone (NSA) configurations. For an NSA configuration, a Long Term Evolution (LTE) Evolved Packet Core (EPC) may be used, and for a SA configuration, a 5G core (5GC) network may be used. For NSA service, an LTE sub-6 cell (e.g., below 6 Gigahertz (GHz)) may be an anchor cell (e.g., Master Cell Group (MCG)) that provides all control signaling, and a NR band may be a secondary cell (e.g., Secondary Cell Group (SCG)) that provides (additional) data service. For SA service, a NR band may provide all control signaling and data service.

The radio frequency bands that support a 5G network may vary. However, for example, the 5G network may include certain categories of radio frequency bands, such as above 6 GHz and below 6 GHz, as well as other nomenclatures, such as sub-3 (e.g., below 3 GHz), mid-band (e.g., between 3 GHz and 6 GHz), low band, millimeter wave (mmWave), and so forth. Regardless of the nomenclatures or categories used, higher frequency bands have larger propagation loss. Hence, a coverage provided by a lower frequency band is larger than a coverage provided by a higher frequency band. Given the difference of radio frequency (RF) propagation characteristics between Sub3 and mid-band, for example, the coverage provided by sub-3 and mid-band are different. In general, mid-band frequencies have larger propagation losses and smaller coverage. Mid-band frequencies may also have significant discrepancies relative to uplink (UL) and downlink (DL) coverage areas. For example, UL coverage may be smaller than DL coverage based on differences in transmit power differences and receiver capability differences (e.g., antenna array, noise figure, etc.) between user equipment (UE) and radio access network (RAN) device (e.g., evolved Node B (eNB), next generation Node B (gNB), etc.).

As the configuration of a network evolves and available radio frequency spectrum is added, there are challenges to manage the RF footprint and a service coverage.

According to exemplary embodiments, a radio frequency band selection service is provided. The radio frequency band selection service may be implemented based on coverage band and service band concepts. According to an exemplary embodiment, the radio frequency band selection service may determine whether a given radio frequency band (e.g., a NR band) is a service band and a coverage band; a service band but not a coverage band; a coverage band and not a service band; or a service band nor a coverage band. The radio frequency band selection service may make such a determination based on various criteria, as described herein.

According to an exemplary embodiment, the radio frequency band selection service may include a default service band and/or a default coverage band, as described herein. According to an exemplary embodiment, the radio frequency band selection service may include threshold values. The threshold values may be used to determine a coverage area for an end device. The radio frequency band selection service may make determinations regarding radio frequency band for use by the end device when in idle mode and/or connected mode, and SA service and/or NSA service.

FIG. 1 is a diagram illustrating an exemplary environment 100 in which an exemplary embodiment of the radio frequency band selection service may be implemented. As illustrated, environment 100 includes an access network 105, and a core network 150. Access network 105 includes access devices 110, and core network 150 includes core devices 155. Environment 100 further includes end devices 199.

The number, type, and arrangement of networks illustrated in environment 100 are exemplary. Additionally, or alternatively, other networks not illustrated in FIG. 1 may be included in environment 100, such as a backhaul network, a fronthaul network, an application layer network, or another type of intermediary network.

The number, the type, and the arrangement of network devices in access network 105, and core network 150, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the radio frequency band selection service may use at least one of these planes of communication. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). Access network 105 may include a wired network, an optical network, or another type of network that may provide communication with core network 150, for example.

Access network 105 may include different and multiple functional splitting, such as options 1, 2, 3, 4, 5, 6, 7, or 8 that relate to combinations of access network 105 and core network 120 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB), etc.), a future generation wireless access device, another type of wireless node (e.g., a WiMax device, a hotspot device, etc.) that provides a wireless access service. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include a 5GC network (also known as NGC network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, a unified data repository (UDR) device, an authentication server function (AUSF), a network slice selection function (NSSF), a network repository function (NRF), a policy control function (PCF), a network data analytics function (NWDAF), a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

End device 199 includes a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

FIG. 2 is a diagram illustrating an exemplary environment 200 in which an exemplary embodiment of the radio frequency band selection service may be implemented. As illustrated, environment 200 depicts different areas within which different wireless services may be implemented. The shape, the size, and the arrangement of the areas are exemplary, and other aspects of the wireless service (e.g., RAT, UL, DL, radio frequency band spectrum, etc.) described herein are also exemplary. Further, an area depicted in environment 200 may be interpreted as an area of a Venn diagram for purposes of coverage and/or service bands, as described herein. Although not illustrated, it may be assumed that access devices 110 may be situated within environment 200 to provide the wireless services described herein.

Locations 1, 2, 3, 4, 5, and 6 illustrated in FIG. 2 represent where end device 199 may be situated at a given time for purposes of description of the radio frequency band selection service. Depending on where end device 199 may be situated relative to the different areas, end device 199 may be afforded a certain coverage or access. As described herein, the radio frequency band selection service may manage various aspects of the wireless service based on various factors, as described herein. The threshold values relating to radio spectrum, as described herein, may be implemented as a single threshold value (e.g., above, below, etc.) or multiple threshold values (e.g., within a range of threshold values).

Referring to FIG. 2, environment 200 includes an LTE coverage area 204 within which end device 199 may obtain LTE UL/DL coverage via an LTE RF band. The LTE coverage may include LTE, LTE-A, and/or LTE-A Pro. Environment 200 may include a NR FR1 sub-3 coverage area 206 within which end device 199 may obtain NR UL/DL coverage via about sub-3 GHz RF band (e.g., NR low band spectrum). Environment 200 may also include an NR FR1 mid-band DL coverage area 210 within which end device 199 may obtain NR DL only coverage via between about 3 GHz and about 6 GHz. As further illustrated, environment 200 may include an NR FR1 mid-band UL/DL coverage area 212 within which end device 199 may obtain NR mid-band UL/DL coverage via about an NR mid-band RF band. NR FR2 areas 208, illustrated as area 208-1 and 208-2 (also referred to herein individually or generally as area 208), may be areas within which end device 199 may obtain NR millimeter wave (mmWave) UL/DL coverage via a mmWave band. As previously mentioned, an area depicted in environment 200 may be interpreted as an area of a Venn diagram for purposes of coverage and/or service bands. For example, area 206, area 208, area 210, and/or area 212 may include LTE UL/DL coverage, or area 208, area 210, and/or area 212 may include sub-3 GHz coverage and LTE coverage in the UL and DL. According to other examples, an area may not be interpreted as an area of a Venn diagram.

As previously mentioned, the radio frequency band selection service may include coverage band and service band concept. For example, the coverage band may provide a larger coverage area (e.g., area 206) relative to a service band area. End device 199 may be configured to camp on a coverage band when in an idle mode (e.g., a Radio Resource Control (RRC) idle mode). A service band may provide data service with a higher throughput relative to a coverage band. For example, areas 210 and 212 and area 208 may provide NR mid-band or mmWave access. End device 199 may be configured to use the service band when in a connected mode (e.g., an RRC connected mode). In some cases, the coverage band and the service band may be the same band. For example, when end device 199 may be situated at location (2), the mid-band access may be used as a service band and a coverage band. According to other cases, the coverage band and the service band may be different. For example, when end device 199 may be situated at location (3), the service band may be the mid-band, and the coverage band may be the sub-3 GHz band.

According to various exemplary embodiments, the radio frequency band selection service may use one or multiple criteria for radio frequency band selection. The criterion or criteria may be used to determine if a given band (e.g., NR band, LTE band) is a service band and a coverage band; a service band but not a coverage band; a coverage band but not a service band; or not a service band and not a coverage band. For example, when end device 199 may be at locations 1 or 2, the mid-band may be used as the service band and the coverage band. Additionally, for example, when end device 199 may be at location 3, the mid-band (e.g., DL coverage but not UL coverage) may be used as a service band but not a coverage band. Additionally, for example, when end device 199 may be situated at location 3, a sub-3 band may be used as a coverage band but not a service band. For example, the sub-3 band may provide UL and DL coverage and mid-band may provide DL coverage but not UL coverage. According to another example, when end device 199 may be situated at locations 4, 5, or 6, a mid-band may not be used as a service band or a coverage band because location 4, 5, or 6 may be outside of mid-band coverage in the UL and the DL.

According to an exemplary embodiment, end device 199 may be configured to search and scan a NR band, and based on a threshold value, select a coverage band for end device 199 to camp on when in an idle mode. According to an exemplary embodiment, the threshold value may be defined for a service band and/or a coverage band. According to an exemplary embodiment, the threshold value may be a static value or a dynamic value. For example, depending on a network state (e.g., anticipated or predictive congestion, congestion, etc.) relative to an area and/or a given application service (e.g., video streaming or another type of application service), the threshold value may change. The threshold value may be implemented as a network configuration.

According to various exemplary implementations, the threshold value may relate to signal strength, and may include one or multiple values such as a Reference Signal Receive Power (RSRP) value, a Received Signal Strength Indicator (RSSI) value, a Reference Signal Received Quality (RSRQ) value, a signal-to-noise ratio (SNR) value, a signal-to-interference-plus-noise ratio (SINR) value, and/or some other channel condition value. For example, a threshold value for a default service band relating to mid-band may include an RSRP value of about −100 decibel-milliwatts (dBm) or some other value. By way of further example, when the signal strength is above this threshold, the default service band may be used as an active service band and an active coverage band. According to other examples, the threshold value may indicate whether a band may be used the active service band but not the active coverage band, or not the active service band and not the active coverage band. According to still other examples, a determination relating to service band and coverage band may include the use of multiple threshold values relating to different bands. For example, when the signal strength of a band is above a first threshold value relating to a coverage band and the signal strength of another band is below a second threshold value relating to a service band, the band may be selected as the coverage band.

According to an exemplary embodiment, when the coverage band and the service band are different bands, end device 199 may provide a measurement (e.g., an RF band measurement, a measurement report, etc.) on the service band to access device 110 when transitioning to a connected mode. According to various exemplary embodiments, the radio frequency band selection service includes measurement of a radio frequency band, as described herein. The measurement of the radio frequency band may be invoked from the network and/or end device. For example, access device 110 may request a measurement of a radio frequency band from end device 199. Alternatively, for example, end device 199 may be configured to measure a radio frequency band and provide the measurement to access device 110.

Figure 3:
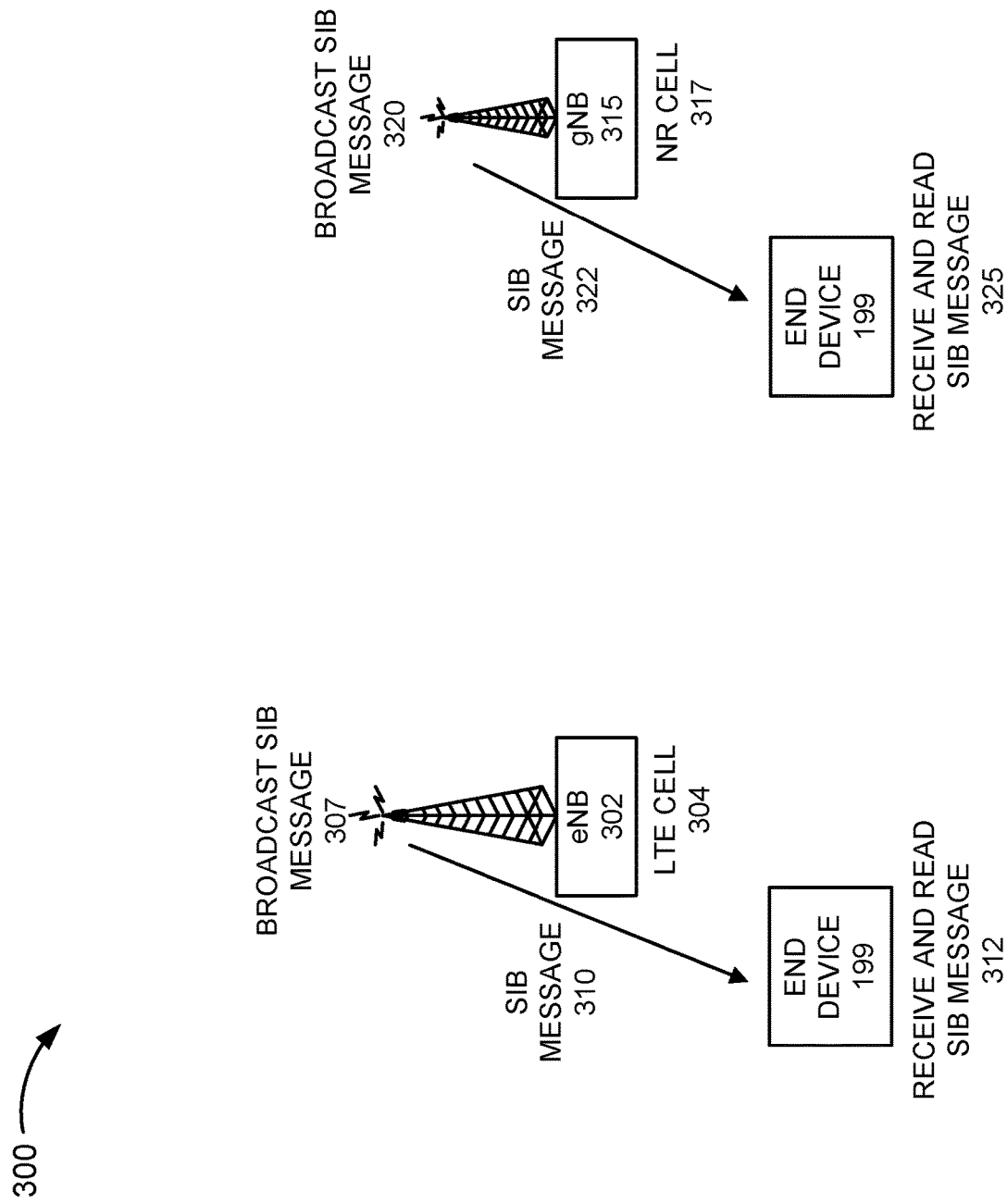
FIG. 3 is a diagram illustrating an exemplary process of an exemplary embodiment of the radio frequency band selection service.

FIG. 3 is a diagram illustrates an exemplary process 300 of the radio frequency band selection service. For example, an eNB 302 of an LTE cell 304 may broadcast a System Information Block (SIB) message 307 to end device 199. SIB message 310 may include radio frequency band selection information. The radio frequency band selection information may include a threshold value and/or a default radio frequency band of the radio frequency selection service, as described herein. For example, the threshold value may include one or multiple threshold values relating to a default service band and/or a default coverage band. The default radio frequency band may include a default service band, a default coverage band, and/or another type of default band. According to an exemplary implementation, SIB message 310 may be a SIB 1 type or another suitable SIB message type (e.g., SIB 3, SIB 4, SIB 5, SIB 24, etc.). For example, when the coverage band may be the same band as the current cell, SIB 1, SIB 3, or SIB 4 may be used to inform end device 199 to stay on the current band. However, for example, when the coverage band may be a different band than the current cell, SIB 3 or SIB 5 may be used to assist end device 199 in reselecting a different frequency band. When the coverage band may be a 5G NR band, SIB 3 or SIB 24 may be used to redirect end device 199 from an LTE band to a 5G NR band as the desired coverage band. As illustrated, end device 199 may receive and read the SIB message 312. End device 199 may perform radio frequency band selection based on the radio frequency band selection information. According to other exemplary embodiments, the provisioning of radio frequency band selection information of end device 199 may be implemented differently, such as the transmission of an RRC message or other type of message from eNB 302. The type of SIB messages described herein are exemplary.

According to another exemplary scenario, a gNB 315 of an NR cell 317 may broadcast a SIB message 320 to end device 199. SIB message 322 may include radio frequency band selection information. The radio frequency band selection information may include a threshold value and/or a default radio frequency band of the radio frequency selection service, as described herein. For example, the threshold value may include one or multiple threshold values relating to a default service band and/or a default coverage band. The default radio frequency band may include a default service band, a default coverage band, and/or another type of default band. According to an exemplary implementation, SIB message 310 may be a SIB 1 type or another suitable SIB message type (e.g., SIB 3, SIB 4, SIB 5, etc.). For example, when the coverage band may be the same band as the current cell, SIB 1, SIB 2, or SIB 3 may be used to inform end device 199 to stay on the current NR band. However, for example, when the coverage band may be a different band than the current cell, SIB 2 or SIB 4 may be used to redirect end device 199 to a different NR frequency band. When the coverage band is an LTE band, SIB 2 or SIB 5 may be used to redirect end device 199 from a 5G NR band to an LTE band as the desired coverage band. As illustrated, end device 199 may receive and read the SIB message 325. End device 199 may perform radio frequency band selection based on the radio frequency band selection information. According to other exemplary embodiments, the provisioning of radio frequency band selection information of end device 199 may be implemented differently, such as the transmission of an RRC message or other type of message from gNB 315. According to other exemplary embodiments, other types of access devices 110, as described herein, may be implemented to transmit radio frequency band selection information to end device 199. The type of SIB messages described herein are exemplary.

Figure 4:
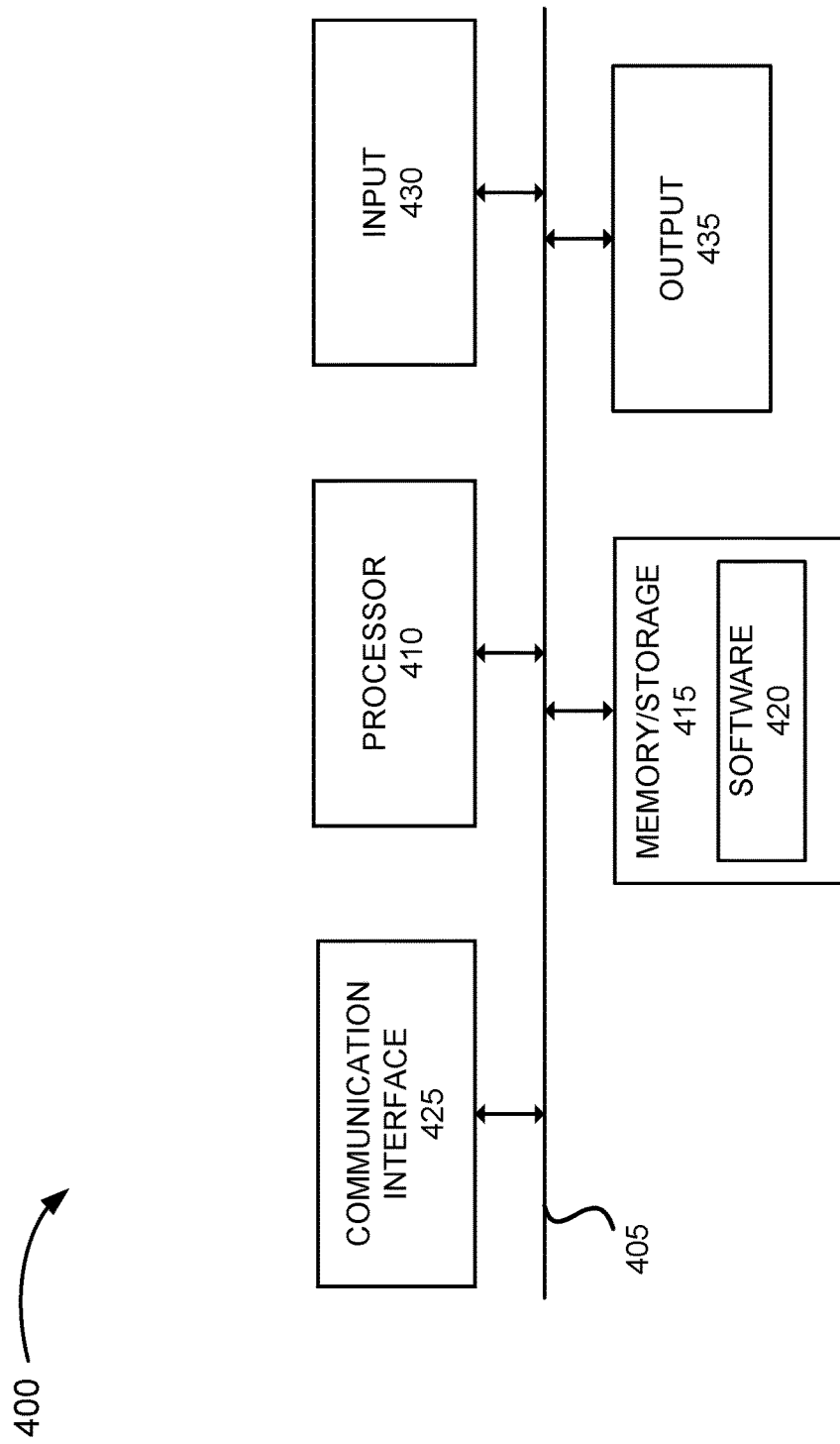
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, external devices 175, end devices 199, eNB 302, gNB 315, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to access device 110, software 420 may include an application that, when executed by processor 410, provides a function of the radio frequency band selection service, as described herein. Additionally, for example, with reference to end device 199, software 420 may include an application that, when executed by processor 410, provides a function of the radio frequency band selection service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, etc., as previously described.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5A:
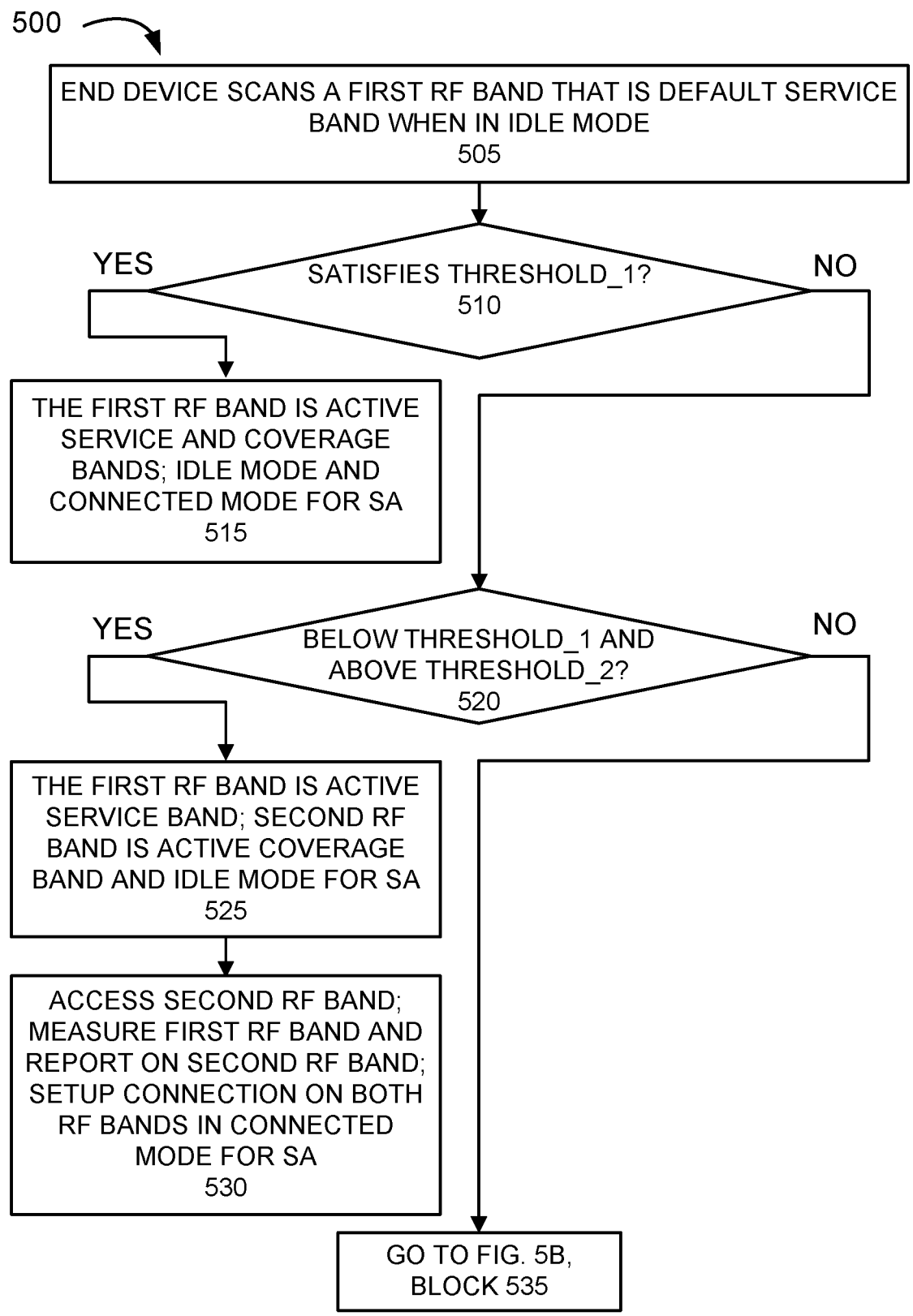
FIGS. 5A and 5B is a flow diagram illustrating an exemplary process of an exemplary embodiment of the radio frequency band selection service.
Figure 5B:
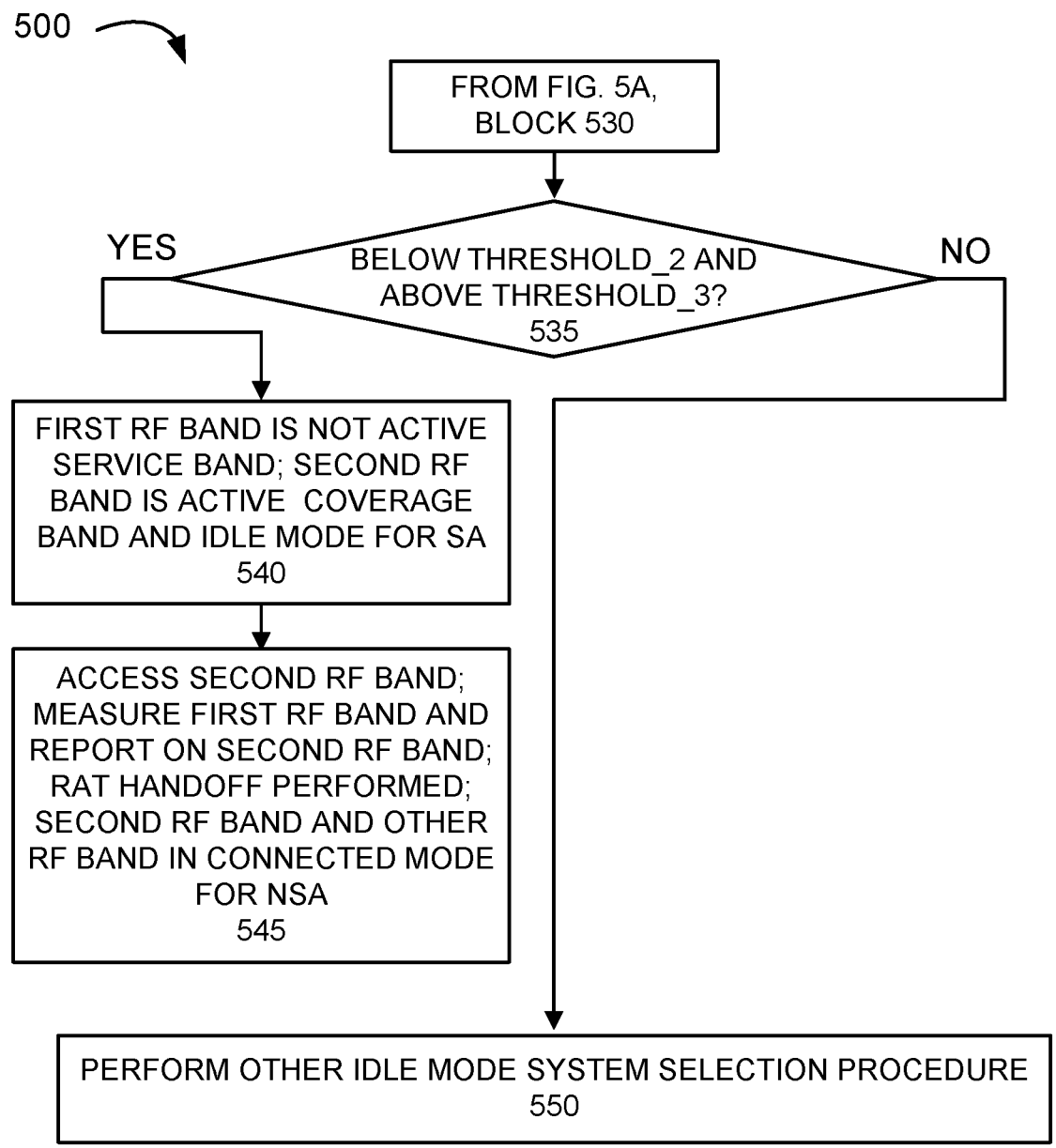

FIGS. 5A and 5B is a flow diagram illustrating an exemplary process 500 of an exemplary embodiment of the radio frequency band selection service. According to an exemplary embodiment, end device 199 may perform steps of process 500. According to an exemplary implementation, processor 410 may execute software 420 to perform a step illustrated in FIGS. 5A and 5B and described herein. Alternatively, a step illustrated in FIGS. 5A and 5B and described herein, may be performed by execution of only hardware. According to an exemplary environment, process 500 may be performed in a multi-RAT RAN (e.g., a 5G-RAN and an E-UTRAN) and associated multi-core complementary networks, as illustrated and described herein.

According to an exemplary embodiment, process 500 may include an RF band that is configured as a default service band. According to an exemplary embodiment, process 500 may include an RF band that is configured as a default coverage band. According to an exemplary embodiment, process 500 may include threshold values. A comparison described in relation to a measured value and a threshold value is exemplary. Additionally, according to various exemplary implementations of process 500, the comparison may include above a threshold value, below a threshold value, above or equal to a threshold value, below or equal to a threshold value, between different threshold values, and so forth.

Referring to FIG. 5A, in block 505, when in an idle mode, end device 199 may search and scan an RF band. For example, the RF band may include a default service band. By way of further example, the default service band may be a NR mid-band or another configured RF band.

In block 510, end device 199 may determine whether a measurement of the default service band satisfies a first threshold value. For example, end device 199 may compare an RSRP value and/or another measured value of the default service band to the first threshold value.

When it is determined that the measured value satisfies the first threshold value (block 510—YES), end device 199 may select the measured RF band as the active service band and the active coverage band (block 515). As an example, referring to FIG. 2, end device 199 may be at location (2) or other location within NR FR1 mid-band UL/DL coverage area 212. When in idle mode, end device 199 may camp on the RF band (e.g., NR mid-band). Additionally, when end device 199 may transition to a connected mode (e.g., based on receiving a page; transmitting a service request (e.g., application service request, etc.), etc.), end device 199 may transition to an SA connected mode with the default service band/measured RF band as a primary cell (PCell).

When it is determined that the measured value does not satisfy the first threshold value (block 510—NO), end device 199 may determine whether the measurement of the default service band may be below the first threshold value but above a second threshold value (block 520). For example, the second threshold value may be a lower value than the first threshold value (e.g., second threshold value<measured value<first threshold value, etc.).

When it is determined that the measured value is between the first threshold value and the second threshold value (block 520—YES), end device 199 may select the measured RF band as the active service band but not as the active coverage band (block 525). Rather, end device 199 may select another RF band (e.g., a default coverage band) as the active coverage band. As an example, referring to FIG. 2, end device 199 may be at location (3) or other location within NR FR1 mid-band DL coverage area 210. End device 199 may camp on, for example, the default coverage band. Additionally, for example, when end device 199 may transition to a connected mode (e.g., based on receiving a page; transmitting a service request (e.g., application service request, etc.), etc.), end device 199 may measure that active service band, and may send a measurement report via the active coverage band (block 530). This may be in addition to any other normal access procedure. End device 199 may set up a connection for an SA connected mode in which the active coverage band may be the PCell and the active service band may be a secondary cell (SCell).

When it is determined that the measured value is not between the first threshold value and the second threshold value (block 520—NO), end device 199 may determine whether the measurement of the default service band may be below the second threshold value but above a third threshold value (block 535 of FIG. 5B). For example, the third threshold value may be a lower value than the second threshold value (e.g., third threshold value<measured value<second threshold value, etc.).

When it is determined that the measured value is between the second threshold value and the third threshold value (block 535—YES), end device 199 may select to camp on, for example, the default coverage band (block 540). As an example, referring to FIG. 2, end device 199 may be at location (4) or other location within NR FR1 sub-3 UL/DL coverage area 206. Additionally, for example, when end device 199 may transition to a connected mode (e.g., based on receiving a page; transmitting a service request (e.g., application service request, etc.), etc.), end device 199 may measure the default service band, but may not send a measurement report (block 545). End device 199 may perform an inter-RAT handover. For example, end device 199 may perform an inter-RAT handover from a NR SA to an LTE and NSA connected mode. The LTE/NSA connection may include the default coverage band as the PCell (e.g., the active coverage band) for LTE or as an MCG (e.g., anchor cell) for NR NSA. The LTE/NSA connection may include other RF bands.

When it is determined that the measured value is not between the second threshold value and the third threshold value (block 535—NO), end device 199 may perform another idle mode system selection procedure (block 550).

FIGS. 5A and 5B illustrate an exemplary process 500 of the radio frequency band selection service, however, according to other embodiments, process 500 may include additional operations and/or different operations than those illustrated in FIGS. 5A and 5B and described herein. For example, process 500 may include end device 199 receiving radio frequency band selection information from access device 110.

According to an exemplary embodiment, process 500 may include a first threshold value, a second threshold value, and a third threshold value. According to an exemplary implementation, when the measured value of the default service band is above the first threshold value, the default service band may be the active service band and the active coverage band. According to an exemplary implementation, when the measured value of the default service band may be below the first threshold value but above the second threshold value, the default service band may the active service band but not the active coverage band. According to an exemplary implementation, when the measured value of the default service band may be below the second threshold value, the default service band may not be the active service band nor the active coverage band. According to an exemplary implementation, when the measured value of the default coverage band may be above the third threshold value and the measured value of the default service band may be below the first threshold value, the default coverage band may be the active coverage band.

FIG. 6 is a flow diagram illustrating another exemplary process 600 of an exemplary embodiment of the radio frequency band selection service. According to an exemplary embodiment, access device 110 may perform steps of process 600. According to an exemplary implementation, processor 410 executes software 420 to perform a step illustrated in FIG. 6 and described herein. Alternatively, a step illustrated in FIG. 6 and described herein, may be performed by execution of only hardware. According to an exemplary environment, process 600 may be performed in a multi-RAT RAN (e.g., a 5G-RAN and an E-UTRAN) and associated multi-core complementary networks, as illustrated and described herein.

Referring to FIG. 6, in block 605, access device 110 may generate a message that includes radio frequency band selection information of the radio frequency band selection service. For example, a gNB, an eNB, or another type of access device 110 (e.g., an eLTE eNB, an RRH, a BBU, a CU, a DU, etc.) may generate a SIB message, an RRC message, or another type of message that includes a threshold value, a default radio frequency band, and/or an instruction in support of the radio frequency band selection service.

In block 610, access device 110 may transmit the SIB message. For example, the gNB, the eNB, or another type of access device 110 may broadcast the message or transmit the message in another manner (e.g., unicast, multicast, etc.).

FIG. 6 illustrates an exemplary process 600 of the core network selection service, however, according to other embodiments, process 600 may include additional operations, fewer operations, and/or different operations than those illustrated in FIG. 6 and described herein. For example, process 600 may include end device 199 receiving the message and performing a procedure or operation in support of the radio frequency band selection procedure service, such as camping or not camping on a radio frequency band/cell when in idle mode, selection of the radio frequency band for connection mode, performing a handover, performing a measurement of a radio frequency band, and other procedures or operations described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   measuring, by an end device when in an idle mode, a first radio frequency band that is a default service band when the end device is in a connected mode;
   comparing, by the end device when in the idle mode, a first measured value to a first threshold value of the first radio frequency band;
   determining, by the end device when in the idle mode, whether the first measured value satisfies the first threshold value; and
   selecting, by the end device when in the idle mode and when the first measured value satisfies the first threshold value, the first radio frequency band as a default coverage band to camp on when in the idle mode and as the default service band when the end device prospectively transitions to the connected mode.

2. The method of claim 1, further comprising:
comparing, by the end device when the first measured value does not satisfy the first threshold value, the first measured value to a first range of values between the first threshold value and a second threshold value;
determining, by the end device, whether the first measured value satisfies the first range of values; and
selecting, by the end device when the first measured value satisfies the first range of values, a second radio frequency band as the default coverage band, to camp on when the end device is in the idle mode and the first radio frequency band as the default service band.

3. The method of claim 2, wherein the first radio frequency band is of a new radio mid-band, and wherein the second radio frequency band is of a new radio sub-3 frequency band, and the method further comprising:
measuring again, by the end device when the end device transitions to the connected mode, the first radio frequency band;
transmitting, by the end device via the second radio frequency band, a measurement value of the first radio frequency band; and
operating, by the end device, in a stand-alone connected mode with a first radio access network (RAN) device of the second radio frequency band as a primary cell, and with a second RAN device of the first radio frequency band as a secondary cell.

4. The method of claim 2, further comprising:
comparing, by the end device when the first measured value does not satisfy the first range of values, the first measured value to a second range of values between the second threshold value and a third threshold value;
determining, by the end device, whether the first measured value satisfies the second range of values; and
selecting, by the end device when the first measured value satisfies the second range of values, the second radio frequency band to camp on when the end device is in the idle mode.

5. The method of claim 4, wherein the first radio frequency band is of a new radio mid-band, and wherein the second radio frequency band is of a new radio sub-3 frequency band, and the method further comprising:
measuring again, by the end device when the end device transitions to the connected mode, the first radio frequency band; and
operating, by the end device, in a non-stand-alone connected mode with a first radio access network (RAN) device of the second radio frequency band.

6. The method of claim 5, wherein subsequent to measuring again and before the operating, the method further comprises:
performing, by the end device, an inter-radio access technology (RAT) handover from a new radio stand-alone to a new radio non-stand-alone.

7. The method of claim 5, wherein the first RAN device is a primary cell for Long Term Evolution (LTE) or a master cell group (MCG) for new radio non-stand-alone.

8. The method of claim 1, wherein the first radio frequency band is of a new radio mid-band, and wherein the connected mode is a new radio stand-alone connected mode with the first radio frequency band.

9. An end device comprising:
a processor, wherein the processor is configured to:
measure, when in an idle mode, a first radio frequency band that is a default service band when the end device is in a connected mode;
compare, when in the idle mode, a first measured value to a first threshold value of the first radio frequency band;
determine, when in the idle mode, whether the first measured value satisfies the first threshold value; and
select, when in the idle mode and when the first measured value satisfies the first threshold value, the first radio frequency band as a default coverage band to camp on when in the idle mode and as the default service band when the end device prospectively transitions to the connected mode.

10. The end device of claim 9, wherein the processor is further configured to:
compare, when the first measured value does not satisfy the first threshold value, the first measured value to a first range of values between the first threshold value and a second threshold value;
determine whether the first measured value satisfies the first range of values; and
select, when the first measured value satisfies the first range of values, a second radio frequency band as the default coverage band, to camp on when the end device is in the idle mode and the first radio frequency band as the default service band.

11. The end device of claim 10, wherein the first radio frequency band is of a new radio mid-band, and wherein the second radio frequency band is of a new radio sub-3 frequency band, and the processor is further configured to:
measure again, when the end device transitions to the connected mode, the first radio frequency band;
transmit, via the second radio frequency band, a measurement value of the first radio frequency band; and
operate, in a stand-alone connected mode with a first radio access network (RAN) device of the second radio frequency band as a primary cell, and with a second RAN device of the first radio frequency band as a secondary cell.

12. The end device of claim 10, wherein the processor is further configured to:
compare, when the first measured value does not satisfy the first range of values, the first measured value to a second range of values between the second threshold value and a third threshold value;
determine whether the first measured value satisfies the second range of values; and
select, when the first measured value satisfies the second range of values, the second radio frequency band to camp on when the end device is in the idle mode.

13. The end device of claim 12, wherein the first radio frequency band is of a new radio mid-band, and wherein the second radio frequency band is of a new radio sub-3 frequency band, and the processor is further configured to:
measure again, when the end device transitions to the connected mode, the first radio frequency band; and
operate in a non-stand-alone connected mode with a first radio access network (RAN) device of the second radio frequency band.

14. The end device of claim 13, wherein subsequent to measuring again and before the operating, the processor is further configured to:
perform an inter-radio access technology (RAT) handover from a new radio stand-alone to a new radio non-stand-alone.

15. The end device of claim 13, wherein the first RAN device is a primary cell for Long Term Evolution (LTE) or a master cell group (MCG) for new radio non-stand-alone.

16. The end device of claim 9, wherein the first radio frequency band is of a new radio mid-band, and wherein the connected mode is a new radio stand-alone connected mode with the first radio frequency band.

17. A non-transitory computer-readable storage medium storing instructions executable by a processor of an end device, which when executed cause the end device to:
  measure, when in an idle mode, a first radio frequency band that is a default service band when the end device is in a connected mode;
  compare, when in the idle mode, a first measured value to a first threshold value of the first radio frequency band;
  determine, when in the idle mode, whether the first measured value satisfies the first threshold value; and
  select, when in the idle mode and when the first measured value satisfies the first threshold value, the first radio frequency band as a default coverage band to camp on when in the idle mode and as the default service band when the end device prospectively transitions to the connected mode.

18. The non-transitory computer-readable storage medium of claim 17, wherein the instructions further include instructions, which when executed cause the end device further to:
  compare, when the first measured value does not satisfy the first threshold value, the first measured value to a first range of values between the first threshold value and a second threshold value;
  determine whether the first measured value satisfies the first range of values; and
  select, when the first measured value satisfies the first range of values, a second radio frequency band as the default coverage band, to camp on when the end device is in the idle mode and the first frequency band as the default service band.

19. The non-transitory computer-readable storage medium of claim 18, wherein the first radio frequency band is of a new radio mid-band, and wherein the second radio frequency band is of a new radio sub-3 frequency band, and wherein the instructions further include instructions, which when executed cause the end device further to:
  measure again, when the end device transitions to the connected mode, the first radio frequency band;
  transmit, via the second radio frequency band, a measurement value of the first radio frequency band; and
  operate, in a stand-alone connected mode with a first radio access network (RAN) device of the second radio frequency band as a primary cell, and with a second RAN device of the first radio frequency band as a secondary cell.

20. The non-transitory computer-readable storage medium of claim 17, wherein the first radio frequency band is of a new radio mid-band, and wherein the connected mode is a new radio stand-alone connected mode with the first radio frequency band.

* * * * *